United States Patent [19]

Halpern et al.

[11] 4,383,322
[45] May 10, 1983

[54] COMBINED USE OF PN SEQUENCE FOR DATA SCRAMBLING AND FRAME SYNCHRONIZATION IN DIGITAL COMMUNICATION SYSTEMS

[75] Inventors: Peter H. Halpern, Longwood; James W. Toy; Charles R. Patisaul, both of Melbourne, all of Fla.

[73] Assignee: Harris Corporation, Melbourne, Fla.

[21] Appl. No.: 146,338

[22] Filed: May 2, 1980

[51] Int. Cl.³ .................. H04K 1/02; H04B 15/00; H04L 7/08
[52] U.S. Cl. .................. 375/1; 179/1.5 R; 375/2.1; 375/112
[58] Field of Search .................. 370/102, 107, 68, 109, 370/110.1, 111; 179/1.5 R, 1.5 S, 1.5 M, 1.5 E; 455/26, 30; 375/1, 112, 114, 115, 2.1, 2.2; 178/22.11–22.19, 22.01

[56] References Cited

U.S. PATENT DOCUMENTS

| | | | |
|---|---|---|---|
| 3,873,773 | 3/1975 | Guy, Jr. | 370/102 |
| 3,931,473 | 1/1976 | Ferris, Jr. | 370/102 |
| 4,045,613 | 8/1977 | Walker | 375/112 |
| 4,052,565 | 10/1977 | Baxter et al. | 179/1.5 S |
| 4,151,373 | 4/1979 | Widmer et al. | 370/111 |
| 4,171,513 | 10/1979 | Otey et al. | 375/106 |
| 4,221,931 | 9/1980 | Seiler | 179/1.5 S |
| 4,305,152 | 12/1981 | Asakawa et al. | 178/22.17 |

*Primary Examiner*—Benedict V. Safourek
*Attorney, Agent, or Firm*—Antonelli, Terry & Wands

[57] ABSTRACT

In a communication system containing a scheme for externally synchronizing and scrambling digital data signals, serial digital data signals to be transmitted are subdivided into prescribed numbers or sets between which additional or overhead bits are inserted, the resulting sequence being summed in a modulo-two adder with a multi-bit maximal length PN sequence, so that one of the overhead bits is one of the bits of the maximal length scrambling sequence.

A multiplexing operation yields a higher data rate sequence which is then modulo-two added with the output of a scrambler and transmitted.

At the receiver station, the incoming scrambled sequence is applied to timing recovery circuitry including a local framing sequence generator. The framing sequence is located and the stages of a separate shift register, which forms part of a descrambler PN sequence generator, are forced to a state which is coincident with the frame marker. This shift register is clocked at the incoming data rate by the recovered clock from a timing recovery circuitry and its output is modulo-two added with the incoming digital data stream, thereby recovering the original multiplexed data.

In order to recover the original data, the descrambled sequence is applied to a demultiplexer which effectively deletes every overhead bit and outputs the original data at the original data rate.

51 Claims, 7 Drawing Figures

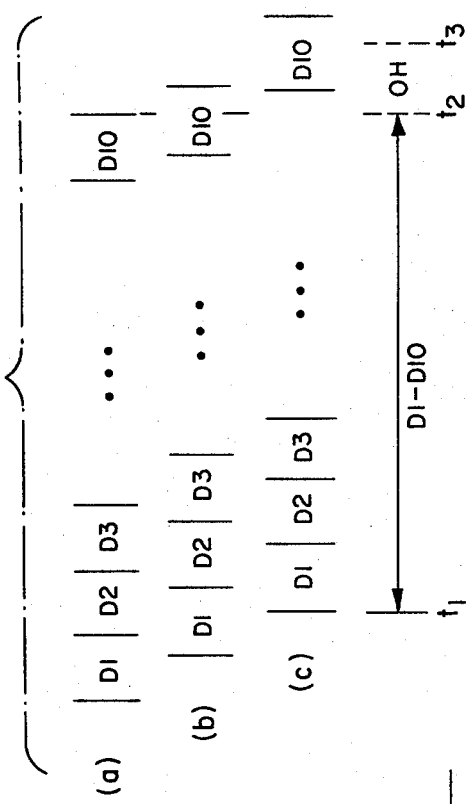
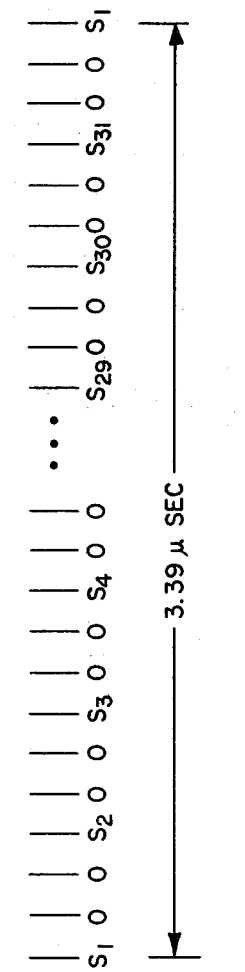

COMBINED USE OF PN SEQUENCE FOR DATA SCRAMBLING AND FRAME SYNCHRONIZATION IN DIGITAL COMMUNICATION SYSTEMS

FIELD OF THE INVENTION

The present invention relates to communication systems and is particularly directed to a scheme for synchronizing and scrambling encoded digital data signals through the use of a pseudo noise sequence generated at a transmitter site and at a remote receiver site.

BACKGROUND OF THE INVENTION

In copending application Ser. No. 149,291, filed May 12, 1980, entitled Repeatered, Multi-Channel Fiber Optic Communication Having Fault Isolation System, by P. Casper et al., and assigned to the assignee of the present application there is described a communication network wherein at a transmitter station high data rate digital data signals are multiplexed with additional signals and the resulting sequence is scrambled and transmitted to a remote receiver station. At the receiver station, the incoming sequence is descrambled and demultiplexed for distribution to various individual circuitry. The communication network described in the above-identified application reflects improvements in the development of sophisticated data transmission systems which are designed to handle a greater density of signalling traffic than previous approaches. The digital signals themselves may represent telephone voice signals, video signals, data, etc. that may be interfaced with the network via telephone lines, microwave terminal interface links, etc.

In this network and other approaches that have been proposed it is convenient and often necessary to organize the data into sequential sets or frames (as is done for video transmission system) and provide frame synchronization signals that permit the receiver station to locate the frames and separate or demultiplex individual sets of signals from a steady stream of data. Where the data stream is scrambled, an additional requirement is placed on the receiver to accurately descramble the incoming signal sequence and then decode or demultiplex the descrambled signals into their original form prior to transmission.

Within the prior art, various systems for accomplishing data scrambling and frame synchronization have been proposed wherein pseudo noise (PN) sequences are used either for scrambling or for providing framing information. The prior art also includes systems that empoly self-synchronized data scrambling and descrambling implementations which involve the use of a maximal length PN sequence that is combined with the data stream to be scrambled via a shift register, modulo-two adder configuration to produce the desired scrambled data sequence. At the receiver, the scrambled data is applied to another shift register, modulo-two adder configuration the selected stage connections of which correspond to those of the scrambler, to thereby remove the scrambling sequence created by the shift register, modulo-two adder feedback arrangement at the transmitter. While this type of arrangement is sometimes useful in that it is self synchronized, requiring no external synchronization, it suffers from error multiplication and less thorough data scrambling than externally synchronized schemes. For an illustration of examples of prior art data scrambling and synchronization arrangements that employ PN sequences, attention may be directed to the U.S. Patents to Tarmo U.S. Pat. No. 3,950,616, Frutiger U.S. Pat. No. 4,979,195, Frey et al. U.S. Pat. No. 3,648,237, Tilk U.S. Pat. No. 3,852,534, Reynolds U.S. Pat. No. 3,808,536, and Betts U.S. Pat. No. 3,947,634.

Unfortunately, these conventional approaches do not provide the degree of signal handling capability and scrambling/descrambling accuracy required for high data rate communication systems. In this regard, as mentioned above, self-synchronizing systems introduce error multiplication and do not have highly thorough scrambling capability.

SUMMARY OF THE INVENTION

Pursuant to the present invention, there is provided a new and improved technique for externally synchronizing and scrambling digital data signals, which offers a convenient method of externally synchronizing the descrambler to the scrambler in a straightforward fashion ensuring thorough data scrambling and eliminating error multiplication. To this end serial digital data signals to be transmitted (e.g. NRZ data signals) are subdivided into prescribed numbers or sets between which additional data bits are inserted. In particular, the additional bits (hereafter termed overhead bits) are inserted between every ten of the original bits and the resulting sequence is summed in a modulo-two adder with a thirty-one bit maximal length PN sequence.

The thirty-one bit scrambling sequence may be generated in a conventional manner using a shift register, modulo-two adder feedback circuit arrangement commonly employed in the art. From the scrambler, the scrambling sequence is applied to a five-bit shift register which is clocked at one thirty-third times the clock rate used for generating the scrambling sequence. As a result, every thirty-third bit from the scrambler is loaded into the five-bit shift register. Because of the inherent nature of a cyclic multibit PN sequence, it turns out that every Kth bit of the thirty-one maximal length PN sequence generated by the scrambler produces another cyclic thirty-one bit maximal length PN sequence. As a result, there is clocked into the five bit shift register a PN sequence derived from the scrambling sequence, which derived sequence is to serve as the framing sequence for the transmitted data.

As mentioned above, the data stream is subdivided into sequences of ten bits between which overhead bits are inserted. Therefore, for every three sequences of data bits there will be an additional three overhead bits yielding a total of thirty three bits. In accordance with the present invention one of these overhead bits is one of the bits of the thirty-one bit maximal length scrambling sequence that is clocked into the five bit shift register. With this format, a frame is comprised of three overhead bits, one of which is a scrambling bit, and thirty data bits. Thirty-one successive frames therefore contain, as the framing bits, the thirty-one bit maximal length PN sequence derived from the scrambling sequence. These thirty-one successive frames are identified as a major frame. The next successive major frame contains new data bits, but repeats the derived PN sequence in the positions of the framing bits.

To mark the beginning of a frame, one of the thirty-one possible states (five zeros being forbidden) of the five bit shift register is selected, thereby identifying the first five framing bits. Using the frame marker as a reference, data to be transmitted is multiplexed with the overhead bits, with zeros being inserted at each of the intended bit positions of the framing sequence. The multiplexing operation is such that the data rate is increased by eleven/tenths of the original data rate to provide for the insertions of the overhead bits without loss of data. The resulting higher data rate sequence is then modulo-two added with the output of the scrambler and transmitted. Since zeros occupy every bit position of the framing sequence (spaced at thirty-three bit intervals), the resulting scrambled data sequence contains the thirty-one bit PN framing sequence inserted in each major frame exactly where required. Advantageously, with this scrambling technique, since each unique state of the framing sequence corresponds to only one state of the scrambling sequence, the receiver station can proceed to descramble the received scrambled sequence by observing the state of the received framing sequence.

In order to recover the framing sequence and descramble the data at the receiver station, the incoming scrambled data sequence is initially applied to timing recovery circuitry which derives a clock signal synchronized with the received data signal and bit-synchronizes the data and the clock. Since it is known that the framing sequence is spaced at thirty-three bit intervals among the received serial data stream, the initial task of the receiver equipment is to detect which sequence of thirty-one bits among the thirty-three possible sequences of a major frame accurately reflects the framing sequence. For this purpose frame synchronization is begun by loading five received scrambled data bits at thirty-three bit intervals into a five bit shift register that forms part of a local PN sequence generator arranged to reproduce the framing sequence. This shift register is therefore clocked at one/thirty-third of the frequency of the clock derived from the received data sequence.

If the clock is in phase with the bit positions of the framing sequence, the shift register will be loaded with five successive bits of the framing sequence and the local framing sequence generator will therefore be capable of generating a PN sequence identical to and in phase with the transmitted framing sequence. To make this determination, the loaded scrambling sequence generator is clocked at one/thirty-third of the recovered clock rate and those data bit positions which have been assumed to correspond to framing bit positions are modulo-two added with the output of the local framing sequence generator. If the loaded sequence is part of the framing sequence the output of the modulo-two adder should be zero for each bit position and over a testing interval the output can be monitored to see if this occurs on a consistent basis. If the chosen sequence of five bits does not belong to the framing sequence, the result of the modulo-two addition will not tend to be zero, indicating that the output of the local framing sequence generator is out of phase with the framing sequence. When this occurs the incoming data stream is effectively caused to be shifted or displaced by one bit position, and the above process is repeated as necessary until eventually the framing sequence is located and the local framing sequence generator is in phase with the framing sequence. From this point on no new loading of the stages of the shift register is conducted; instead, the local framing sequence generator is simply clocked at one/thirty-third of the recovered clock rate until a frame marker decoder, coupled to the stages of the five bit shift register, detects the appearance of the frame marker sequence. At this time, the stages of a separate five bit shift register, which forms part of a descrambler PN sequence generator, are forced to the state coincident with the frame marker. This separate five bit shift register is clocked at the incoming data rate by the recovered clock and its output is modulo-two added with the incoming digital data stream, thereby recovering the original multiplexed data with the original zeros inserted at the framing bit positions.

To recover the original data stream, the descrambled sequence is applied to a demultiplexer which effectively deletes every eleventh bit, corresponding to the overhead bits and outputs the original data at ten/elevenths of the recovered clock rate, namely, at exactly the original data rate. Recovery of the other overhead bits is effected through a demultiplexer which effectively strips off the original data and framing bits and distributes the other two bits of each frame as intended.

BRIEF DESCRIPTION OF THE DRAWINGS

FIGS. 1-3 are respective illustrations of the subframe, frame and major frame format of data to be transmitted in the communication system according to the invention;

FIG. 6 is a timing diagram useful in explaining the operation of the logic of FIG. 5.

DETAILED DESCRIPTION

Figure 4:
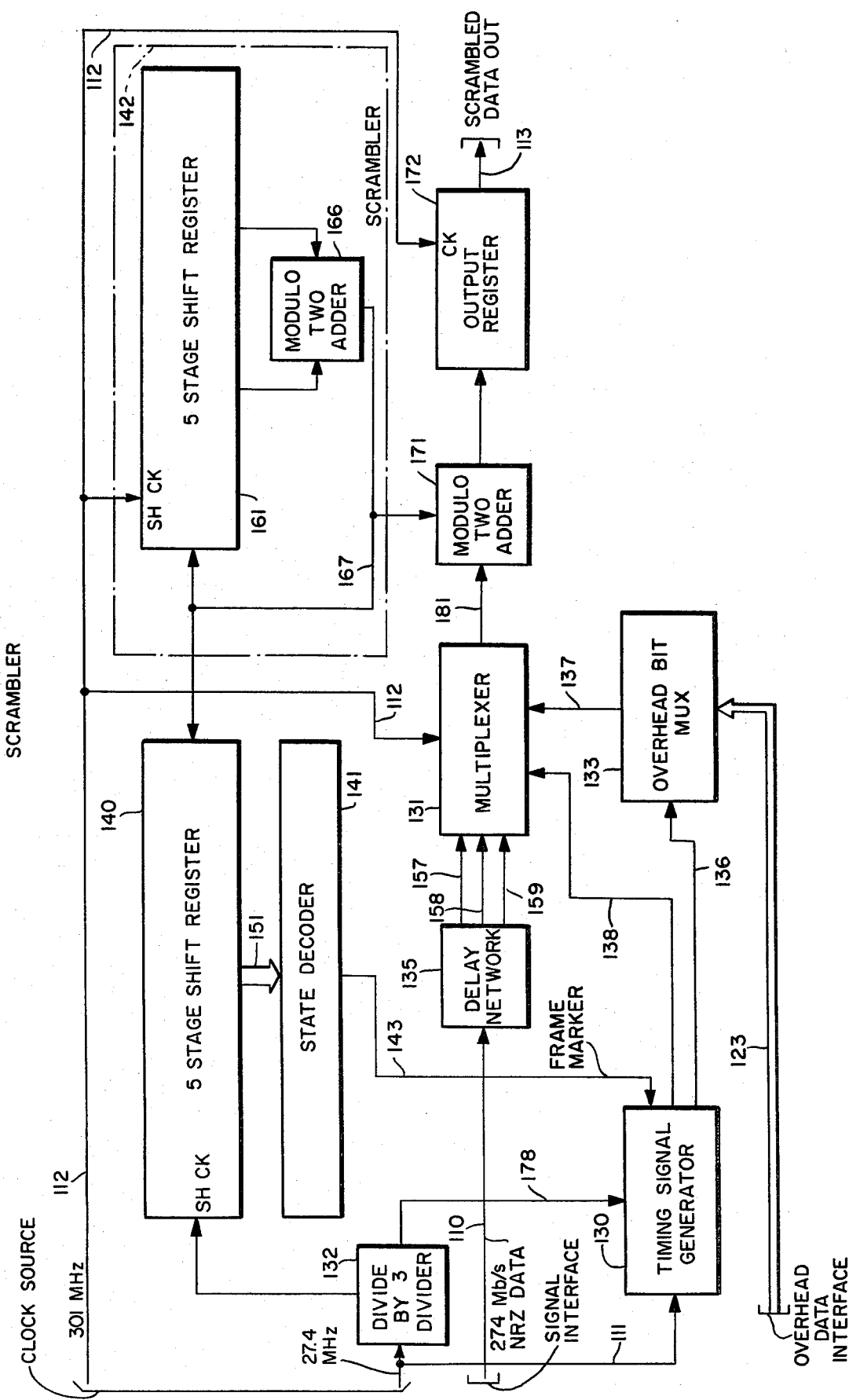
FIG. 4 is a schematic block diagram of a data multiplexer/scrambler.

In order to facilitate an understanding of the configuration and operation of the scrambler/descrambler and frame synchronization arrangements of the present invention it is convenient to focus initially on the format of the digital data to be scrambled. For purposes of the present description it will be assumed that the data is high data rate NRZ digital telephone traffic (e.g. T4 data), the sequential bits of which are supplied from a suitable signal interface. In the communication network described in the above-referenced application, the incoming digital signals have a baud rate of 274 Mb/s and in the present description this data rate will be described for purposes of illustrations.

In accordance with the present invention the incoming data is subdivided into groups or sets of a prescribed number of data bits and an additional or overhead bit is inserted between each group, with the resulting data stream having a data rate in excess of that of the original data by an amount that permits insertion of the overhead bit while retaining the integrity of the original data. For purposes of the present description these groups or sets of data may consist of ten successive original data bits. These ten data bits taken together with an inserted overhead bit constitute a subframe of data as shown in FIG. 1. At the repetition rate of the original data (i.e., 274 MHz) the period of each NRZ data bit is 3.65 nanoseconds. To insert an additional or overhead bit within this time frame so that the next data bit following the group of ten will not be lost, the data rate must be increased by eleven/tenths to approximately 301 Mb/s. FIG. 1 shows the period of subframe at the 301 Mb/s rate covering 36.5 nanoseconds so that each data bit is compressed to a period of approximately 3.3 nanoseconds. The manner in which this compression takes place will be described below with reference to the description of the data encoder. For the present, it is sufficient to understand that each intended subframe format is shown in FIG. 1.

The overhead bit may represent any described information that may be appropriately digitally encoded to be compatible with the other data bits (here in NRZ encoded form). As will be explained in detail below certain ones of the overhead bits are reserved or assigned as framing bits that enable the receiver circuitry to descramble and demultiplex the received scrambled data stream and thereby obtain the NRZ data in its original form and at the original data rate. The framing or frame synchronization bits occupy the overhead bit position of every third subframe, three subframes constituting a frame, as shown in FIG. 2. A major frame of data is comprised of a number of frames corresponding to the number of bit combinations that make up a prescribed number maximal length PN sequence, as can be generated by a shift register modulo-two adder feedback configuration. For a five stage (N=5) shift register PN sequence generator, the sequence is a $2^N - 1 = 2^5 - 1$ or 31 bit maximal length sequence. Therefore, a major frame of data, shown in FIG. 3, consists of 31 frames each of which contains a framing bit $S_1$, $S_2$–$S_{31}$, produced by such a PN sequence generator.

Pursuant to the present invention the PN sequence the individual bits of which make up the frame synchronization bit sequence $S_1$–$S_{31}$ is used to scramble each and every data and overhead bit prior to transmission. Using the same sequence facilitates synchronization and descrambling at the receiver and thereby simplifies the signal processing circuitry involved. This joint use of the same PN sequence permits external synchronization of the receiver and thorough data scrambling.

SCRAMBLER

Reference is now directed to FIG. 4 which depicts the data encoder/scrambler portion of the system. The configuration shown in this figure corresponds to the transmit encoder module described in the above referenced copending application. However, those portions of the circuitry that are not necessary for an understanding of the invention have been omitted in order to focus upon the novel aspects of the data scrambling and synchronization features of the invention. For other aspects of the transmit encoder module, particularly as they relate to the overall communication network, reference may be had to the other application.

As was pointed out above it will be assumed for purposes of the present description that the data to be scrambled and transmitted is digitally encoded NRZ data having a data rate of 274 Mb/s. The incoming data is applied over a line 110 from a signal interface (not shown). Clock signals, as may be derived from suitable timing recovery and divider circuitry supply clock signals over clock lines 111 and 112. On line 111 there is supplied a clock, synchronized with the data, at one-tenth the data rate or 27.4 MHz which is applied to a divide-by-three divider 132 and a timing signal generator 130. A second clock signal at eleven/tenths of the incoming data rate ($\simeq$301 MHz) is coupled over line 112 to a multiplexer 131, the shift enable or clock input of a five stage shift register 161 and the clock input of an output register 172. These clock signals are used by the encoder/scrambler to compress the data bits to a data rate of 301 Mb/s and thereby enable the insertion of an overhead bit for every ten data bits, and to control the scrambling and transmission of the data, as will be explained in detail below. For an illustration of exemplary clock receiving circuitry that may be used to generate these clock signals reference may be directed to the description and illustration of the transmit timing and recovery module in the above identified application.

Figure 5:
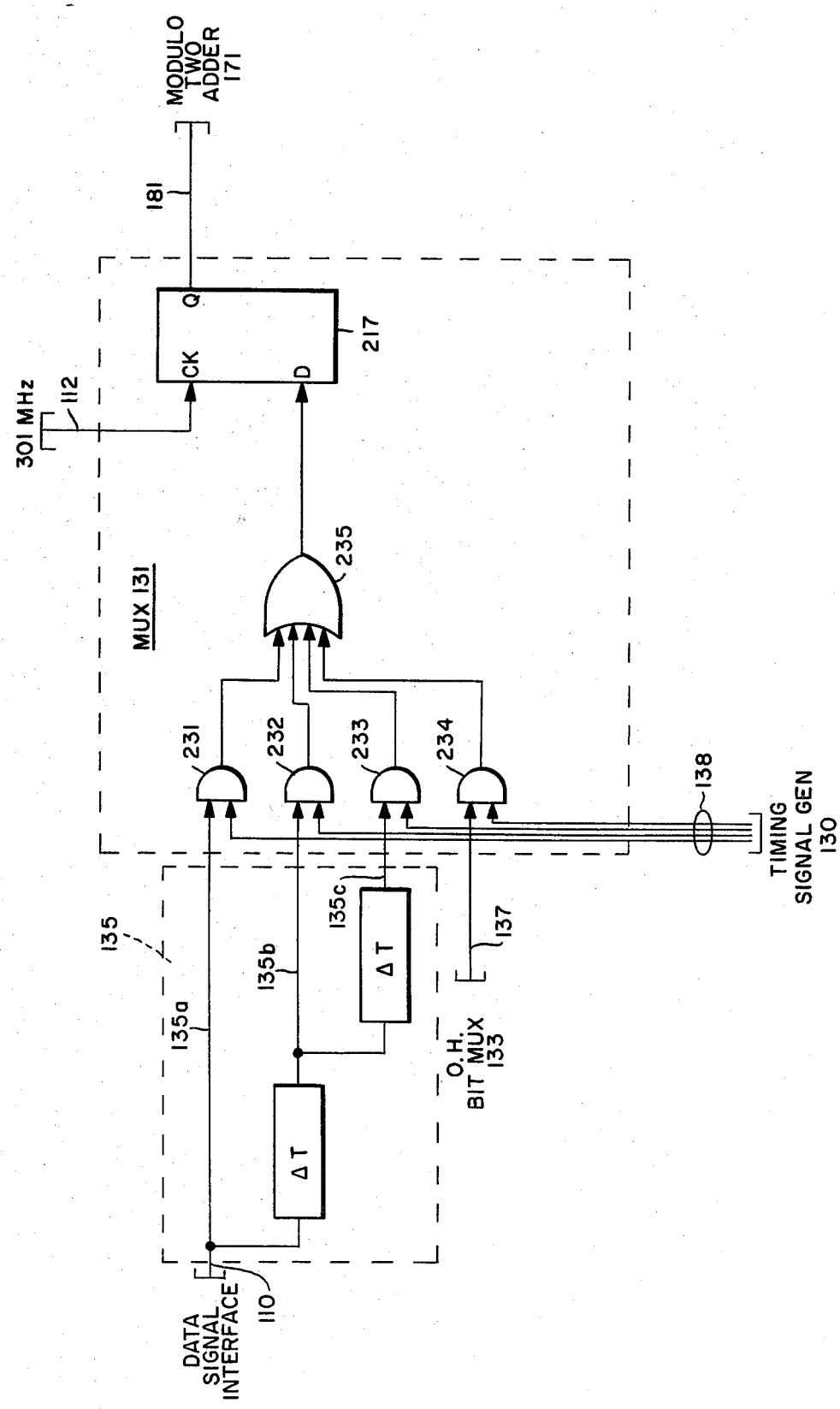
FIG. 5 is a detailed logic diagram of the delay/multiplexer portion of the scrambler of FIG. 4.

Prior to inserting the overhead bits, including the frame synchronization bits, the incoming digital data stream on line 110 must be compressed from its 274 Mb/s data rate to a 301 Mb/s rate to allow for the insertion of the overhead bit for every ten data bits to thereby produce a subframe depicted in FIG. 1. For this purpose the incoming data on line 110 is coupled to a delay network which operates in conjunction with a multiplexer 131 and timing signal generator 130 to increase the data rate of the incoming data stream and to insert overhead bits supplied by overhead bit multiplexer 133 at every eleventh bit position of the output of multiplexer 131. As shown in FIG. 5 delay network 135 may comprise a plurality of parallel delay channels 135a, 135b, 135c of different time delays to produce sequences of the 274 Mb/s data stream successively displaced in time with respect to one another over lines 157, 158, and 159, respectively. Thus, with reference to the data timing sequences illustrated in FIG. 6 and considering a sequence of ten successive data bits D1–D10, the action of delay network 135 serves to produce successively offset (in time) data sequences (a), (b) and (c). The period of time covering bits D1–D10 for a 274 Mb/s rate is approximately 36.5 nanoseconds. With successive delays using parallel channels, the period of time from the beginning of one delayed sequence such as sequence (c) to the end of another sequence of a lesser or no delay such as sequence (a) (i.e., between instants of time $t_1$ and $t_2$ shown in FIG. 6) is compressed to a length of time considerably shorter than the 36.5 nanosecond time span (for ten bits at 274 Mb/s) of each sequence. As was pointed out above, pursuant to the example chosen the output data rate is 301 Mb/s. Since ten successive bits at 301 MHz rate cover a time span of only approximately 33 ns, then for the additional approximately 3.5 nanoseconds otherwise occupied by a data bit in the incoming data stream in line 110, it is possible to insert an overhead bit or auxiliary bit for synchronization and control purposes without loss of data by compressing the data using delay network 135 and multiplexer 131. For this purpose, timing signal generator 130, which is comprised of suitable combinational logic and delay circuitry to generate timing signals in a straightforward manner, controls the multiplexing or switching action of multiplexer 131.

As is shown further in FIG. 5, multiplexer 131 may comprise a set of gates 231–234 respectively coupled to each data stream delay lines 157–159 and to line 137 which is coupled to the output of overhead bit multiplexer 133. The outputs of the gates 231–234 are coupled through OR gate 235 to the D input of clocked flip-flop 217. The clock input of flip-flop 217 is coupled to line 112 over which the 301 MHz clock for reading out the compressed data and overhead bits is supplied. The selective enabling of the respective gates 231–234 of multiplexer 131 that are coupled to lines 157–159 and 137 is controlled by a set of timing signals supplied by timing signal generator 130 over link 138; these timing signals may be derived by appropriately delaying and logically operating on delayed ones of the 27.4 MHz clock coupled to timing signal generator 130 over line 111. Thus, for example, and referring again to FIG. 6, the selective control or timing signals supplied over link 138 to muliplexer 131 may be such as to couple data bits D1–D3 from sequence (c), data bits D4–D7 from sequence (b) and data bits D8–D10 from sequences (a) through multiplexer 131 with the 301 MHz signal applied over line 112 clocking out the values of these gates data bits from the Q output of flip-flop 217 at the 301 Mb/s readout rate over line 181. Between time instants $t_2$ and $t_3$ the timing or control signal on line 138 enables gate 234 (FIG. 5), so that the overhead bit on line 137 can be clocked out at the 301 Mb/s data rate. Thus, the combined action of delay network 135, overhead bit multiplexer 133 and multiplexer 131 is to compress the incoming 274 Mb/s data rate to a 301 Mb/s data rate and then insert a selected overhead bit between each group of ten data bits. As a result, from multiplexer 131 there is produced a modified data sequence of the ten original data bits followed by one additional or overhead bit. Namely, by compressing the 274 Mb/s data to a rate of 301 Mb/s, then, for every ten input data bits there are produced eleven output bits.

Referring further to FIG. 4, the output 181 of multiplexer 131 is coupled to one input of a modulo-two adder 171. A second input of modulo-two adder 171 is coupled to output line 167 from a scrambler 142. Scrambler 142 serves to generate a 31 bit maximal length PN sequence and is comprised of five stage shift register 161, the output of selected ones of which are coupled to a modulo-two adder 166. The output of modulo-two adder 166 is coupled to the input of the first stage of shift register 161 and to the input of the first stage of a five stage shift register 140. Shift register 161 of scrambler 142 is clocked at the 301 MHz clock rate via line 112. With five shift register stages, scrambler 142 is equipped to supply a 31-bit maximal length pseudorandom sequence that is modulo-two combined with the data and overhead bit sequence readout of multiplexer 131 to scramble the data on line 181.

The PN scrambling sequence from scrambler 142 on line 167 is clocked into shift register 140 at 1/33 times the scrambler clock rate. This is achieved by the provision of a divide-by-three divider 132 coupled to line 111 over which the 27.4 MHz clock is supplied. The result is that every thirty-third bit from scrambler 142 is loaded into shift register 140. As mentioned previously, it can be shown that taking every Kth bit from a cyclic 31-bit maximal length sequence generates another cyclic 31-bit maximal length PN sequence. For the scrambler 142 shown in FIG. 4, the sequence generated by taking every 33rd bit of the scrambling sequence on line 167 is a replica of the scrambling sequence and serves as a framing sequence.

Now within this framing sequence one of the thirty-one possible states of shift register 140 is used as a frame marker to identify the beginning of a frame, namely frame synchronization bits $S_1$, $S_2$, $S_3$, $S_4$ and $S_5$. This frame marker is used as a timing reference to synchronize the insertion of zeros for the overhead bits at the frame synchronization bit positions and for this purpose the stages of shift register 140 are coupled over link 151 to a state decoder 141. State decoder 141 consists of combinational logic configured to decode one of the thirty-one possible states (all zeros being forbidden for a maximal length sequence) of shift register 140 to mark the beginning of a frame. When the frame marker sequence is detected by state decoder 141 an output signal is supplied over line 143 to timing signal generator 130.

Logic in timing signal generator 130 responds to the clock signal on line 178 from divider 132 and signal on line 143 to couple a signal over line 136 to multiplexer 131 to be inserted as an overhead bit at the intended frame synchronization bit position in synchronization with a timing signal on line 138. Thereafter, for each clock signal from divider 132 timing signal generator 130 couples a signal over line 136 causing a zero to be supplied over line 137 to multiplexer 131, thereby causing a zero to be inserted at every third overhead bit position. For the other two overhead bit positions of each frame, timing signal generator 130 responds to the 27.4 MHz clock on line 11 and supplies a signal over line 136 causing overhead bit multiplexer 133 to couple the bit on link 123 to line 137 as the overhead bit. These additional overhead bits may represent control or status information, for example, separate from the data, as explained in the above-referenced application.

Now, as the 301 Mb/s data and overhead bit stream is clocked out of multiplexer 131 and summed in modulo-two adder 171 with the scrambling sequence supplied over line 167, the zero bits occupying the framing bit positions $S_i$ shown in FIG. 3 are replaced by every thirty-third bit of the scrambling sequence on line 167, thereby inserting the 31-bit PN framing sequence precisely where required in the major frame. Because each unique state of the framing sequence $S_1$–$S_{31}$ contained within the major frame corresponds to only one state of the scrambling sequence produced by scrambler 142, synchronization of the descrambler, to be described in detail below in conjunction with FIG. 7, can be achieved by observing the state of the recovered framing sequence.

As the scrambled sequence is generated by modulo-two adder 171 it is coupled to an output register 172 and, via a suitable delay (not shown), it is clocked out of register 172 over line 113 at the 301 MHz clock rate supplied over line 112. Line 113 couples the scrambled 301 Mb/s data sequence to a transmitter (not shown) for transmission to a receiver site.

DESCRAMBLER

Figure 7:
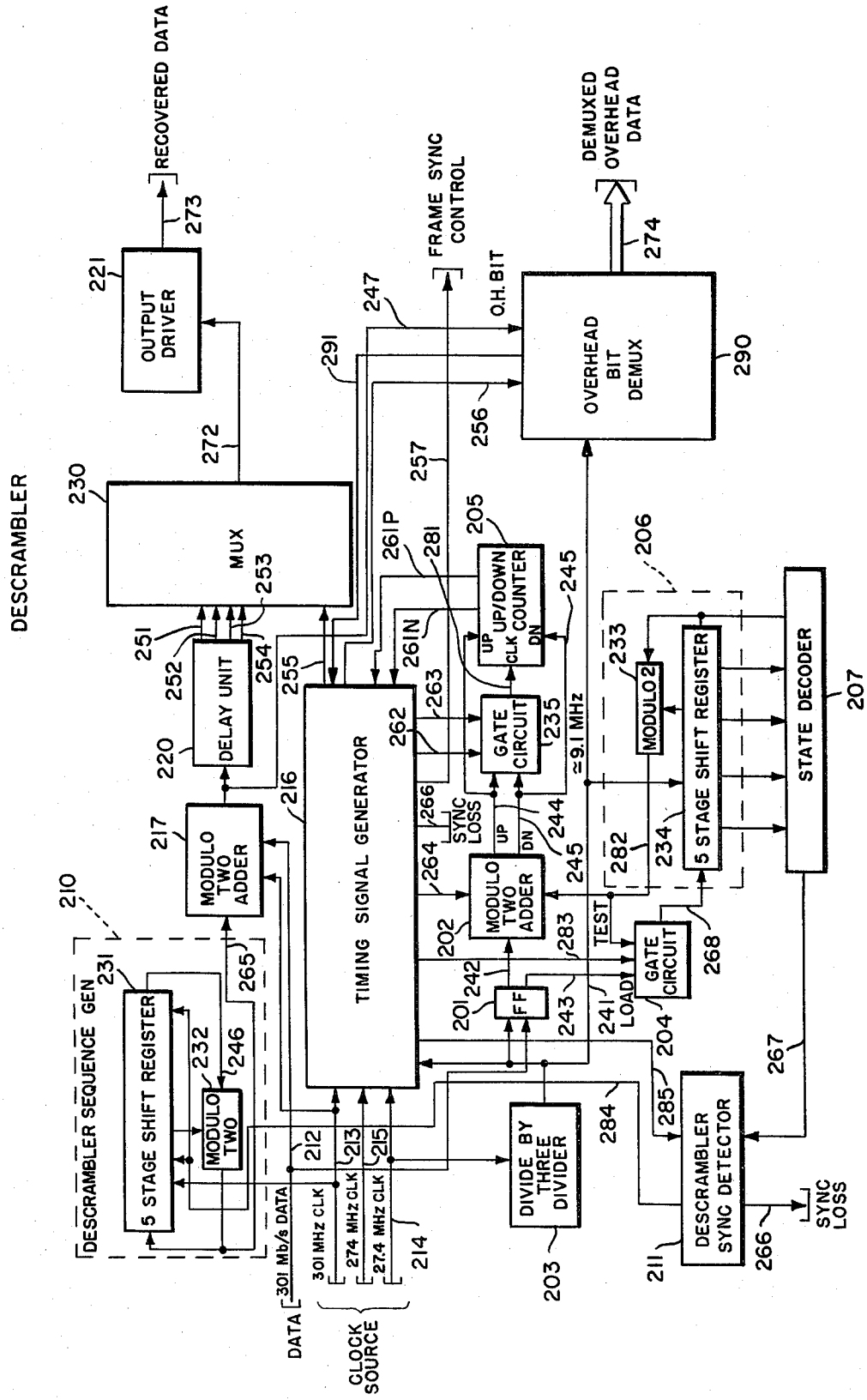
FIG. 7 is a schematic block diagram of a data descrambler/demultiplexer.

Referring next to FIG. 7 illustrating a schematic block diagram of the descrambler according to the present invention, it will be assumed that at the receiver site containing the descrambler, suitable receiver and timing signal receiving circuitry is employed to receive the scrambled data sequence that has been transmitted from the transmitter site to the receiver site. The timing recovery circuitry may include the bit synchronizer circuitry described and illustrated in the above referenced application. From the received data signals which have been transmitted at the 301 Mb/s data rate, timing signals corresponding to the data rate and divided down clock signals are generated. These clock signals correspond to those employed in the scrambler, i.e. clock signals at 301 MHz and 27.4 MHz, plus a 274 MHz clock not used on the transmit side.

The 301 Mb/s data itself is coupled over line 212, while the clock signals are coupled to the descrambler over lines 213–215, as shown. The descrambler operates to descramble and remove the overhead bits from the 301 Mb/s data stream coupled over line 212. The descrambled data stream that is produced at the output 273 of the descrambler is at 274 MHz so that it corresponds to the original data sequence supplied to the transmitter and has a bit rate corresponding to that of the original data sequence.

Since the data stream that is applied to the descrambler is augmented by overhead bits scrambled by a maximal length PN sequence, it is necessary to descramble the incoming data sequence and remove the overhead bits in order for accurate data recovery to be effected. As was explained previously in conjunction with the description of the scrambler, every third overhead bit of each major frame corresponds to a respective bit of the original PN scrambling sequence. In order to implement the data recovery process, the descrambler must initially locate this framing bit sequence. Once the location of the framing bit sequence is identified, the PN generator of a local descrambler is then placed in the proper state to begin descrambling the data so that the overhead bits can be removed and the data bits forwarded to output line 273.

For implementing the above events, the descrambler includes a flip-flop 201, the D input of which is coupled to the scrambled data stream sequence that is coupled to the descrambler over line 212. Flip-flop 201 is clocked at a frequency of one/thirty-third of the incoming data rate or approximately 9.1 MHz. For this purpose the 27.4 MHz clock supplied over line 214 is applied to a divide-by-three divider 203, the output of which is applied over line 241 to the clock input of flip-flop 201. This 9.1 MHz clock on line 241 together with the other clock signals on lines 213, 214 and 215 are applied to a timing signal generator 216. Timing signal generator 216 is configured of appropriate combinational logic for generating enabling and timing signals at selected times in accordance with the sequence of events to be described fully below. The particular design of the combinational logic circuitry employed may take various forms readily implemented by the skilled artisan, given the subsequently described sequence of events which take place during the reception and descrambling of the data stream. The various signal control lines from timing signal generator 216 are depicted and will be described in conjunction with the interconnection and operation of the descrambler.

The Q output of flip-flop 201 is coupled over line 242 to one input of modulo-two adder 202 a second input of which is coupled over line 282 from frame sync PN generator 206. Modulo-two adder 202 is comprised of an exclusive OR gate coupled to a flip-flop, the Q and $\bar{Q}$ outputs of which are applied over lines 244 and 245, respectively, to gate circuit 235 and to the count UP and count DOWN control inputs of UP/DOWN counter 205. Line 264 from timing signal generator 216 clocks the output of the exclusive OR gate through the flip-flop to be applied to lines 244 and 245. The Q output of flip-flop 201 is coupled to a first input (labelled LOAD) of a gate circuit 204. A second output (labelled TEST) of gate circuit 204 is coupled to the output line 282 of frame sync PN generator 206. Frame sync PN generator 206, like descrambler 210 and scrambler 142 (FIG. 4) is configured of a multistage (5 stages) shift register 234 and a modulo-two adder 233 coupled to the outputs of prescribed stages of the shift register and connected in a feedback path to the first stage via gate circuit 204 and gate output line 268. Gate circuit 204 is controlled via line 283 from timing signal generator 216 and selectively couples either the scrambled data on line 243 that is clocked out of flip-flop 201 or the output of modulo-two adder 233 to line 268 and into the first stage of five stage shift register 234. Frame sync PN generator 206 is clocked at the 9.1 MHz clock rate supplied over line 241 to the clock input of shift register 234.

The outputs of the respective stages of shift register 234 are coupled to a state decoder 207 which is comprised of a combinational logic connected to the outputs of the stages of shift register 234. This combinational logic is used to detect the frame marker and causes the logic level on line 267 to change state when the contents of shift register 234 correspond to the prescribed sequence of framing bits that represent the frame marker. Descrambler sync detector 211 operates in conjunction with frame sync PN generator 206 and state decoder 207 to enable the descrambling of the incoming data stream upon the frame synchronization bit sequence having been located and the frame marker identified. Namely descrambler sync detector 211 presets the stages of descrambler sequence generator 210 in the correct logic state so that descrambler sequence generator 210 will produce on output line 265 a descrambling sequence exactly in phase with and identical to the scrambling sequence that has been combined with the data bits in the transmitter. As a result, when the descrambling sequence from descrambler sequence generator is modulo-two added to the incoming scrambled data stream, the scrambling sequence will be removed leaving only the original data and overhead bits.

Descrambler sync detector 211 comprises a latch switching circuit which monitors the level change on line 267 and thereafter applies a signal over line 284 to respective stages of shift register 231 upon the application of a timing signal on line 285 from timing signal generator 216. During a loss of sync condition indicating that the framing sequence and frame marker have not been located, descrambler sync detector 211 couples a loss of sync signal over line 266 to timing signal generator 216.

The outut of descrambler sequence generator 210 (generator 210 being configured exactly the same as scrambler 142 within the scrambler of FIG. 4) is coupled over line 265 to modulo-two adder 217. Like modulo-two adder 202, adder 217 contains an exclusive -OR circuit coupled in series with one input of a clocked flip-flop. The two inputs of the exclusive -OR circuit are coupled to lines 265 and 212, with the flip-flop being clocked by the 301 MHz signal on line 213. Modulo-two adder 217 combines the incoming scrambled data stream on line 212 with the descrambling sequence provided at the output of modulo-two 232 and produces a descrambled 301 Mb/s data stream on line 247. Line 247 is coupled to a delay unit 220 and to an overhead bit demultiplexer 290. Delay unit 220 is comprised of a series of three delay units and produces an undelayed signal on line 251 and three delayed signals of successively longer delay times on lines 252–254. Each of lines 251–254 is applied as a respective input to multiplexer 230. To control the selective switching of inputs 251–254 to output line 272 of multiplexer 230, a switching control line 255 is coupled from timing signal generator 216 to multiplexer 230. Multiplexer 230 may be configured in a manner similar to multiplexer 131 of the scrambler with link 255 supplying respective timing enabling signals to the gates to which lines 251–254 are coupled, the combined outputs of the gates being clocked through a flip-flop. For this latter purpose link 255 further includes a line coupled to input line 215 for clocking the flip-flop at the 274 MHz rate. As will be appreciated from the previous description of the action of delay network 135 and multiplexer 131 of the scrambler (shown in detail in FIG. 5), by successively delaying the input serial data stream among a plurality of parallel paths, selective control of the spacing of the data bits and thereby the bit rate of the resultant data stream can be effected. This permits both the insertion and deletion of selected data bits through the selective enabling of the gate circuits of the multiplexer at desired time intervals. In the descrambler, each overhead or eleventh bit in the serial data stream is deleted by selectively disabling the gate that is coupled to receive the output of the longest effective delay path, here line 254, during the interval occupied by the overhead bit. With the data being clocked out of multiplexer at 274 MHz clock rate the resultant sequence is a serial data stream containing only data bits at a 274 Mb/s bit rate. Output line 272 is coupled to an output driver 221, which buffers the output 274 Mb/s data stream for subsequent delivery to downstream processing circuitry.

For distributing the overhead bits contained in the descrambler serial data stream produced at the output of modulo-two adder 217 to their respective destinations, line 247 at the output of modulo-two adder 217 is coupled to an overhead bit demultiplexer 290. Demultiplexer 290 has an output link 274 format of plurality of output lines coupled to overhead bit distribution equipment. Timing signal generator 216 delivers selective enabling signals over link 256 to demultiplexer 290 in synchronization with the occurrence of the non-frame sync overhead bits, so that those bits will be selectively coupled to intended output circuitry, once the frame sync marker has been detected by sync detector 211, as explained above.

Frame synchronization is accomplished by the operation of up/down counter 205. Up/down counter 205 is clocked by pulses applied from gate circuit 235 over line 281. Gate circuit 235 is coupled to receive a pair of clock pulse signals on lines 262 and 263 from timing signal generator 216. Line 262 supplies a single clock pulse to one input of gate circuit 235 while line 263 supplies a prescribed plurality of clock pulses to the gate circuit. Gate circuit 235 couples one of the single pulses on line 262 and the plural pulses on line 263 to line 281 and the clock input up/down counter 205 in response to control signals on lines 244 and 245. As was described above, lines 244 and 245 are coupled to respective Q and $\overline{Q}$ outputs of a flip-flop in modulo-two adder circuit 202. These outputs govern the switching action of gate circuit 235 during frame synchronization acquisition. As long as the inputs on lines 242 and 282 to modulo-two adder circuit match, as is the case for an in-sync condition, there is an output on line 244 causing gate circuit 235 to couple a single pulse on line 262 and to counter 205. The signal on line 244 causes counter 205 to be incremented by a count of one and this process continues until the counter has reached capacity, after which consecutive agreements at the inputs to modulo-two adder 202 simply cause the contents of counter 205 to remain at its highest count. When counter 205 is incremented to its maximum count, line 261 couples a signal to timing signal generator 216 indicating an apparent synchronous condition between the synchronization PN sequence produced by frame synchronization PN generator 206 and every thirty-third bit in the incoming scrambled data sequence supplied to modulo-two adder circuit 202 from flip-flop 201.

During the process of searching for and locking onto the frame synchronization sequence produced by frame sync PN generator 206, for an out-of-sync condition, the output of generator 206 on line 282 and the output of flip-flop 242 will frequently fail to match, so that an output is produced on line 245 causing the contents of up/down counter 205 to be decremented by a prescribed number of pulses, e.g., eleven pulses. After several "misses", the counter reaches its maximum count, whereby the signal level on line 261 at the output of counter 205 is at a different state than for an in-sync condition described above. In response to this signal, timing signal generator 216 produces a signal on line 257 which is coupled to the timing recovery circuit (not shown) from which the 301 MHz clock is derived. The timing recovery circuit may include a gate circuit that responds to the signal on line 257 and inhibits or deletes one of the 301 MHz clock pulses from which the 27.4 MHz clock signal on line 214 is derived, so that an additional 301 MHz clock pulse cycle is required before the next 27.4 MHz clock pulse is coupled over line 214 to divider 203. Since the output of divide-by-three divider 203 on line 241 controls the clocking of flip-flop 201 and frame sync PN generator 206, the effect of the pulse deletion is to delay the clocking of flip-flop 201 and frame sync PN generator 206. As will be explained below, this action is taken to effectively enable the shifting of a new sequence of five data bits, offset in phase by one data bit, from the previous sequence loaded in shift register 234, so that a new attempt to locate the frame synchronization pattern in new bit positions of the incoming data stream shifted in phase from those previously examined can be carried out.

In addition to applying a frame sync control signal on line 257, timing signal generator 216 supplies a switching control signal over line 283 to gate circuit 204 causing the output of flip-flop 201 on line 243, applied to the LOAD input, to be coupled to line 268. This action causes five new data bits to be loaded into shift register 234 of frame sync PN generator 206. As explained above, because of the deletion of the 301 MHz clock pulse in the production of the 27.4 MHz clock, these five new bits correspond to those that are shifted by one 301 MHz clock pulse period relative to the positions that would have been occupied by the next five bits occupying consecutive every thirty-third positions of the scrambled data sequence. Once the time required to load these bits into shift register 234 has elapsed, the state of line 283 switches the output of gate circuit 204 to the TEST input that is connected to line 282, and modulo-two adder circuit 202 compares to PN sequence from generator 206 with every thirty-third bit of the incoming scrambled data sequence. The above-described procedure is thereafter repeated until the framing bit sequence is located, at which time the output on line 261 from up/down counter 205 causes timing signal generator 216 to supply a signal to line 285 indicating that the frame synchronization PN sequence has been located. Once the framing sequence has been located, there is no further loading of new data bits or the deletion of 301 MHz clock pulses since frame sync PN generator 206 is producing the framing bit sequence exactly in phase with the framing bit sequence occupying every third overhead bit position of the incoming scrambled data stream. Instead, generator 206 is clocked in synchronism with the bit positions of the framing sequence in the incoming data. Eventually, as the contents of shift register 234 continue to change in response to the 9.1 MHz clock on line 241, the frame marker pattern occupies the five stages of shift register 234. Thereupon, descrambler sync detector 211 causes a prescribed state code to be loaded into selected stages of shift register 231 of descrambler sequence generator 210 in response to an output over line 267, to mark the beginning of a frame. Modulo-two adder 217 is now able to descramble the incoming data stream.

In operation, the descrambler carries out a prescribed sequence of steps to implement data recovery. The first step is the location of the framing bit sequence. Once the framing bit sequence has been identified, the sequence of frame sync bits $S_1$–$S_5$ marking the beginning of a frame, termed the frame marker, is located so that descrambling of the data and attendant demultiplexing of the overhead bits can commence.

As was described above, location of the framing bit sequence is implemented by the controlled operation of frame sync PN generator 206. Let it be initially assumed that the framing bit sequence in the incoming scrambled data sequence is not synchronized with the framing PN sequence clocked out of generator 206. As the scrambled 301 Mb/s data sequence is received over line 212 it is applied to the D input of flip-flop 201. Divide-by-three divider 203 divides the 27.4 MHz clock from the bit synchronizer module on line 214 into an approximately 9.1 MHz clock signal that clocks every thirty-third bit of the scrambled data sequence through flip-flop 201 to modulo-two adder 202 via line 242. Via line 283 timing signal generator 216 causes gate circuit 204 to load five successive supposed framing bits of the incoming data sequence. Each of the supposed framing bits is separated from adjacent supposed framing bits by thirty-two other bits since flip-flop 201 is clocked at 1/33rd of the 301 MHz data rate. Upon the expiration of the time to load these five bits into shift register 234, timing signal generator 216 supplies a switching signal on line 283 to cause gate circuit 204 to couple line 282 at its input to recirculation output line 268. Now, the clocked output of flip-flop 201 on line 242 is compared with the PN sequence produced by generator 206 as each is clocked by divider 203.

Should the bits from each match, modulo-two adder produces an output on line 244 causing gate circuit 235 to apply a single pulse on line 262 to line 281 which increases the count of counter 205. Should the bits applied to modulo-two adder circuit 202 not match, an output is produced on line 245 causing gate circuit 235 to couple line 263 to line 281, whereby the contents of counter 205 are decremented by the number of pulses applied to line 281.

The above described incrementing/decrementing of counter 205 continues until the contents of counter 205 reach a maximum or minimum. The former occurrence corresponds to a frame synchronization condition wherein the incoming data sequence is properly phased with the frame bit sequence produced by generator 206 except for occasional bit errors, so that counter 205 will tend to count up to maximum capacity and remain there. Here, it has been assumed that the data sequence is not properly phased with the output of frame sync PN generator 206 so that counter 205 counts down and eventually goes to minimum, whereupon an output is produced on line 261 N indicating that the contents of counter 205 have gone to minimum and that the frame sync PN sequence produced by generator 206 is not properly phased with the framing bit sequence contained in the incoming data stream.

Timing signal generator responds to the output on line 261 N by supplying a frame sync control signal on line 257 to the timing recovery circuitry so that the incoming data sequence is shifted in phase by the period of one 301 MHz clock signal. Timing signal generator 216 further causes the level on line 283 to change state so that gate circuit 204 couples output line 268 to its LOAD input and five new data bits corresponding to five newly assumed bit positions for the location of the frame bit sequence are loaded into shift register 234. Upon the expiration of the time required to load the five new bits into shift register 234, the level on line 283 changes state and gate circuit 204 couples line 282 to line 268. Thereupon, a comparison of the newly assumed framing bit sequence and the PN sequence produced by generator 204 is conducted. The above described procedure is repeated until eventually counter 205 tends to count up indicating that the scrambled data bits occupying the locations of the bits of the assumed framing bit sequence correspond to the bit sequence produced at the output of generator 206, whereupon counter 205 produces an output on line 261P. In response to this output, timing signal generator delivers a signal over line 285 to descramble sync detector 211 indicating that the PN sequence produced by frame sync PN generator 206 is properly phased with the frame sync bits in the incoming data, enabling descrambler sync detector 211 to look for a frame marker output on line 267.

Now that the two sequences occupy the same bit time slots, the descrambler next proceeds to locate the frame marker. Assuming that the frame marker does not correspond to the five bits of the PN sequence contents of register 234 at the time synchronization is detected, so that there is no frame marker identification signal on line 267, then descrambler sync detector 211 does not change the state of output line 284. As scrambled data continues to be received, frame sync PN generator 206 is clocked and the state of the stages of shift register 234 are changed to different ones of its thirty-one possible states. Eventually the code in shift register 234 matches the frame marker and the level on line 267 changes state, causing descrambler sync detector 211 to supply an output on line 284; also the level of line 266 changes state. Since line 284 causes prescribed stages of register 231 to be preset to the state which equates the contents of register 231 with the frame marker code now stored in register 234, the output of descrambler sequence generator is fully synchronized with the incoming data sequence so that descrambling of the data can begin.

Descrambling of the data is carried out at the 301 MHz clock rate on line 213 which clocks the output flip-flop of modulo-two adder 217, so that a 301 Mb/s descrambled data sequence is produced on line 247. As was explained above, delay unit 220 and multiplexer 230 downconvert the 301 Mb/s data to a 274 Mb/s sequence while dropping the overhead bits, to produce on line 272 a serial data stream corresponding to the original 274 Mb/s data sequence. The overhead bits in the 301 Mb/s descrambled data output of modulo-two adder circuit 217 are demultiplexed by demultiplexer 290 for delivery to their respective output lines via link 274 under control of the 9.1 MHz clock supplied over line 241 and a demultiplexer steering signal on link 256. It should be noted that once frame sync has been achieved, the descrambled frame sync bit should always be a logic zero. If the frame sync bit is not zero, the descrambler 210 started in the wrong place and needs to be restarted. Under control of line 291 from overhead bit demultiplexer 290, the timing signal generator 216 is commanded to reinitiate frame search if the descrambled frame sync bit is non-zero. If this happens, a frame sync control pulse is output to the timing recovery circuitry and a new set of five bits are loaded into register 234.

As will be appreciated from the foregoing description of the data scrambling and frame synchronization technique according to the present invention, external synchronization and decoding of scrambled data is conducted with the use of a common PN sequence generated at each of separate transmitter and receiver sites. Advantageously, the properties of PN sequences are exploited to control the insertion and decoding of frame synchronization bits. As the descrambling process carried out at the receiver is not self synchronizing, there is no error multiplication. The effectively total randomization of the transmitted data while still providing a means for accurately and predictably recovering the framing sequence is especially useful in a communication network wherein the incoming data to be transmitted itself is substantially random, as is the case with high data rate high density digitized telephone trunking systems.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A communication system comprising:
   first means, coupled to receive a serial data signal stream to be transmitted, for inserting prescribed signals between preselected ones of the data signals of said serial data signal stream to be transmitted and thereby obtaining an output signal stream; and
   second means, coupled to said first means, for combining said output signal stream with a prescribed scrambling signal sequence, to thereby scramble the data signals of said serial data signal stream and insert respective signals of said prescribed scrambling signal sequence in place of said prescribed signals between preselected ones of the scrambled data signals.

2. A data scrambler system comprising:
   first means for receiving a serial data signal stream to be scrambled; and
   second means for combining the data signals of said serial data signal stream with a prescribed scrambling signal sequence in such a manner as to scramble the data signals of said serial data signal stream and to insert respective signals of said prescribed scrambling signal sequence between preselected ones of the scrambled data signals.

3. A communication system comprising:
   a data scrambler including
   first means for receiving a serial data signal stream to be scrambled, and
   second means for combining the data signals of said serial data signal stream with a prescribed scrambling signal sequence in such a manner as to scramble the data signals of said serial data signal stream and to insert respective signals of said prescribed scrambling signal sequence between preselected ones of the scrambled data signals; and
   a data descrambler including
   third means, coupled to receive the output of said second means, for generating a signal sequence, corresponding to said prescribed scrambling signal sequence, in synchronism with the respective signals of the prescribed scrambling sequence inserted between preselected ones of the scrambled data signals, and
   fourth means, coupled to said third means and coupled to receive the output of said second means, for combining the signal sequence generated by said third means with the output of said second means in such a manner as to descramble the scrambled data signals and to remove the respective signals of said prescribed scrambling sequence from between said preselected ones of the data signals.

4. For use in a communication system wherein the data signals of a serial data signal stream are combined with a prescribed scrambling signal sequence in such a manner as to scramble the data signals of said serial data stream and to insert respective signals of said prescribed scrambling signal sequence between preselected ones of the scrambled data signals and thereby produced a scrambled signal stream, a descrambler for receiving said serial data signal stream comprising:
   first means, coupled to receive said scrambled signal stream, for generating a first signal sequence, corresponding to said prescribed scrambling signal sequence, in synchronism with the respective signals of the prescribed scrambling sequence inserted between preselected ones of the scrambled data signals; and
   second means, coupled to said first means and coupled to receive said scrambled signal stream, for generating a second signal sequence, corresponding to said prescribed scrambling sequence and combining said second signal sequence with said scrambled signal stream in such a manner as to descramble the scrambled data signals and remove the respective signals of said prescribed scrambling sequence from between said preselected ones of the data signals.

5. A communication system according to claim 1, further comprising:
   third means, coupled to receive the output of said second means, for generating a signal sequence, corresponding to said prescribed scrambling signal sequence, in synchronism with the respective signals of the prescribed scrambling sequence inserted between preselected ones of the scrambled data signals; and
   fourth means, coupled to said third means and coupled to receive the output of said second means, for combining the signal sequence generated by said third means with the output of said second means in such a manner as to descramble the scrambled data signals and to replace the respective inserted signals of said prescribed scrambling sequence with said prescribed signals.

6. A communication system according to claim 5, further comprising fifth means for removing said prescribed signals from between said preselected ones of said scrambled data signals.

7. A data scrambler system according to claim 2, wherein said second means comprises means for causing said scrambled data signals to have a data repetition rate higher than that of the received serial data stream to be transmitted.

8. A communication system according to claim 1, wherein said output signal stream has a data repetition rate higher than that of the received serial data signal stream to be transmitted.

9. A system according to one of claims 1, 2, 3 and 4, wherein said prescribed scrambling sequence comprises an n-bit maximal length PN signal sequence.

10. A communication system according to one of claims 1 and 5, wherein said second means includes a modulo-two adder coupled to combine said output signal stream with said prescribed scrambling signal sequence.

11. A communication system according to claim 1, wherein said first means comprises means for periodically inserting prescribed additional signals between preselected ones of the data signals of said serial data signal stream.

12. A communication system according to claim 11, wherein said prescribed signals correspond to preselected ones of said prescribed additional signals.

13. A communication system according to one of claims 1 and 12, wherein said second means comprises means for generating an n-bit maximal length PN signal sequence as said prescribed scrambling sequence, and effectively periodically sampling said n-bit maximal length PN signal sequence and inserting the signals sampled from said n-bit maximal length PN signal sequence between said preselected ones of the data signals of said serial data signal stream.

14. A communication system according to claim 11, wherein said first means comprises means for compressing the data signals of said serial data signal stream such that the reciprocal of the sum of the time interval occupied by the data signals between said periodically inserted prescribed additional signals and an inserted prescribed additional signal is equal to the repetition rate of the received serial data signal stream.

15. A communication system according to claim 14, wherein said compressing means comprises means for generating successively delayed versions of said serial data signal stream and selectively combining prescribed portions of said successively delayed versions of said serial data signal stream.

16. A communication system according to claim 15, wherein said selectively combining means comprises a multiplexer to which the successively delayed versions of said serial data stream and said prescribed signals are coupled, said output signal stream being obtained from the output of said multiplexer.

17. A communication system according to claim 16, wherein said second means comprises a modulo-two adder coupled to combine the output of said multiplexer with said prescribed scrambling sequence.

18. A descrambler for a communication system according to claim 4, wherein said first means includes:
means for generating said first signal sequence, corresponding to said prescribed scrambling signal sequence, at a signal repetition rate corresponding to the repetition rate of said prescribed scrambling sequence inserted between preselected ones of the scrambled data signals, and
means for controllably shifting the phase of said generated signal sequence to bring said generated signal sequence into synchronism with the respective signals of said prescribed scrambling sequence inserted between selected ones of the scrambled data signals.

19. A communication system according to claim 18, wherein said first signal sequence generating means includes:
means for generating said first signal sequence in accordance with selected components of said scrambled signal stream, and wherein
said controllably shifting means includes means for changing the selected components of said scrambled signal stream in accordance with which said first signal sequence is generated by said generating means.

20. A communication system according to claim 19, wherein said controllably shifting means includes means for comparing said generated signal sequence with periodically occurring ones of the scrambled data signals and changing said selected components of said scrambled signal stream in response to a continued unequal comparison of said generated signal sequence with said periodically occurring ones of the scrambled data signals.

21. A descrambler for a communication system according to claim 18, wherein said second means comprises means, responsive to the output of said controllably shifting means, for synchronizing the generation of said second signal sequence with said scrambled signal stream.

22. A descrambler for a communication system according to claim 21, wherein said generating means comprises:
a first shift register, selected stages of which are coupled to a first modulo-two adder means connected in a feedback path to the input of said first shift register to thereby generate a scrambling sequence at the output thereof,
and
means for clocking said first shift register at a rate corresponding to the data rate of said prescribed scrambling sequence inserted between selected ones of the scrambled data signals, and wherein said second means comprises:
a second shift register, selected stages of which are coupled to a second modulo-two adder means connected in a feedback path to the input of said second shift register to thereby generate a scrambling sequence at the output thereof,
means for clocking said second shift register at a rate corresponding to the data rate of said scrambled signal stream,
and
means, responsive to a selected condition of the stages of said first shift register, for causing the stages of said second shift register to be placed in a prescribed condition that results in the generation of a scrambling sequence in synchronism with the scrambling sequence contained in said scrambled data stream.

23. A descrambler for a communication system according to claim 22, wherein said second means further comprises adder means for combining said scrambled data stream with the output of said second modulo-two adder means to thereby descramble said scrambled data stream to obtain the original serial data signals with said prescribed signals inserted therebetween, and wherein said descrambler further includes
third means, coupled to the output of said adder means, for generating successively delayed versions of the descrambled output thereof and selectively combining prescribed portions of the selectively delayed versions of said descrambled output so as to remove said inserted prescribed signals and thereby obtain said serial data signal stream.

24. A descrambler for a communication system according to claim 23, wherein said third means comprises a multiplexer to which the successively delayed versions of the output of said adder means are applied, and means for controllably clocking the output of said multiplexer at a frequence corresponding to the data rate of said serial data signal stream.

25. A communication system according to claim 22, wherein the scrambling sequences generated by said first and second means are n-bit maximal length PN sequences.

26. A communication system according to claim 3, wherein said second means comprises means for causing said scrambled data signals to have a data repetition rate higher than that of the received serial data stream to be transmitted.

27. A communication system according to claim 3, wherein said prescribed scrambling sequence comprises an n-bit maximal length PN signal sequence.

28. A communication system according to claim 3, wherein said second means includes a modulo-two adder coupled to combine said output signal stream with said prescribed scrambling signal sequence.

29. A communication system according to claim 3, wherein said second means comprises means for periodically inserting prescribed additional signals between preselected ones of the data signals of said serial data signal stream.

30. A communication system according to claim 29, wherein the signals of said prescribed scrambling sequence correspond to preselected ones of said prescribed additional signals.

31. A communication system according to claim 30, wherein said second means comprises means for generating an n-bit maximal length PN signal sequence as said prescribed scrambling sequence, and means for effectively periodically sampling said n-bit maximal length PN signal sequence and inserting the signals sampled from said n-bit maximal length PN signal sequence between said preselected ones of the data signals of said serial data signal stream.

32. A communication system according to claim 31, wherein said second means comprises means for compressing the data signals of said serial data signal stream such that the reciprocal of the sum of the time interval occupied by the data signals between said periodically inserted prescribed additional signals and an inserted prescribed additional signal is equal to the repetition rate of the received serial data signal stream.

33. A communication system according to claim 32, wherein said compressing means comprises means for generating successively delayed versions of said serial data signal stream and selectively combining prescribed portions of said successively delayed versions of said serial data signal stream.

34. A communication system according to claim 33, wherein said selectively combining means comprises a multiplexer to which the successively delayed versions of said serial data stream and said prescribed additional signals are coupled, said output signal stream being obtained from the output of said multiplexer.

35. A communication system according to claim 34, wherein said second means comprises a modulo-two adder coupled to combine the output of said multiplexer with said prescribed scrambling sequence.

36. A communication system according to claim 3, wherein said third means includes means for generating a first signal sequence, corresponding to said prescribed scrambling signal sequence, at a signal repetition rate corresponding to the repetition rate of said prescribed scrambling sequence inserted between preselected ones of the scrambled data signals, and means for controllably shifting the phase of said generated signal sequence to being said generated signal sequence into synchronism with the respective signals of said prescribed scrambling sequence inserted between selected ones of the scrambled data signals.

37. A communication system according to claim 36, wherein said first signal sequence generating means includes means for generating said first signal sequence in accordance with selected components of said scrambled signal stream, and wherein said controllably shifting means includes means for changing the selected components of said scrambled signal stream in accordance with which said first signal sequence is generated by said generating means.

38. A communication system according to claim 37, wherein said controllably shifting means includes means for comparing said generated signal sequence with periodically occurring ones of the scrambled data signals and changing said selected components of said scrambled signal stream in response to a continued unequal comparison of said generated signal sequence with said periodically occurring ones of the scrambled data signals.

39. A communication system according to claim 36, wherein said fourth means comprises means, responsive to the output of said controllably shifting means, for generating a second signal sequence corresponding to said prescribed scrambling sequence, in synchronism with said scrambled signal stream.

40. A communication system according to claim 39, wherein said generating means comprises:

a first shift register, selected stages of which are coupled to a first modulo-two adder means connected in a feedback path to the input of said first shift register to thereby generate a scrambling sequence at the output thereof, and means for clocking said first shift register at a rate corresponding to the data rate of signals, and wherein said fourth means comprises a second shift register, selected stages of which are coupled to a second modulo-two adder means connected in a feedback path to the input of said second shift register to thereby generate a scrambling sequence at the output thereof.

means for clocking said second shift register at a rate corresponding to the data rate of said scrambled signal stream, and means, responsive to a selected condition of the stages of said first shift register, for causing the stages of said second shift register to be placed in a prescribed condition that results in the generation of scrambling sequence in synchronism with the scrambling sequence contained in said scrambled data stream.

41. A communication system according to claim 40, wherein said fourth means further comprises adder means for combining said scrambled data stream with the output of said second modulo-two adder means to thereby descramble said scrambled data stream to obtain the original serial data signals with prescribed signals inserted therebetween, and wherein said descrambler further includes fifth means, coupled to the output of said adder means, for generating successively delayed versions of the descrambled output thereof and selectively combining prescribed portions of the selectively delayed versions of said descrambled output so as to remove said inserted prescribed signals and thereby obtain said serial data signal stream.

42. A communication system according to claim 41, wherein said fifth means comprises a multiplexer to which the successively delayed versions of the output of said adder means are applied, and means for controllably clocking the output of said multiplexer at a frequency corresponding to the data rate of said serial data signal stream.

43. A communication system according to claim 40, wherein the scrambling sequences generated by said third and fourth means are n-bit maximal length PN sequences.

44. The communication system according to claim 13, wherein said first means comprises means for compressing the data signals of said serial data signal stream such that the reciprocal of the sum of the time interval occupied by the data signals between said periodically inserted prescribed additional signals and an inserted prescribed additional signal is equal to the repetition rate of the received serial data signal stream.

45. A communication system according to claim 44, wherein said compressing means comprises means for generating successively delayed versions of said serial data signal stream and selectively combining prescribed portions of said successively delayed versions of said serial data signal stream.

46. A communication system according to claim 45, wherein said selectively combining means comprises a multiplexer to which the successively delayed versions of said serial data stream and said prescribed signals are coupled, said output signal stream being obtained from the output of said multiplexer.

47. A communication system according to claim 46, wherein said second means comprises a modulo-two adder coupled to combine the output of said multiplexer with said prescribed scrambling sequence.

48. A method of scrambling data to be transmitted comprising the steps of:
 (a) inserting prescribed signals between preselected ones of the data signals of a serial data signal stream to be transmitted, thereby obtaining a modified data signal stream; and
 (b) combining said modified data signal stream with a prescribed scrambling signal sequence, to thereby scramble the data signals of said serial data signal stream and insert respective signals of said prescribed scrambling signal sequence in place of said prescribed signals between preselected ones of the scrambled data signals.

49. A method of scrambling data comprising the step of:
 combining the data signals of a serial data signal stream with a prescribed scrambling signal sequence in such a manner as to scramble the data signals of said serial data signal stream and to insert respective signals of said prescribed scrambling signal sequence between preselected ones of the scrambled data signals.

50. A method of carrying out data communication between a transmitter and a receiver comprising the steps of:
 at said transmitter
 (a) combining data signals of a serial data signal stream to be transmitted with a prescribed scrambling signal sequence in such a manner as to scramble the data signals of said serial data signal stream and to insert respective signals of said prescribed scrambling signal sequence between preselected ones of the scrambled data signals, thereby obtaining a resultant scrambled sequence;
 (b) transmitting said resultant scrambled sequence to said receiver; and at said receiver
 (c) receiving said resultant scrambled sequence;
 (d) generating a signal sequence, corresponding to said prescribed scrambling signal sequence in synchronism with the respective signals of the prescribed scrambling sequence inserted between preselected ones of the scrambled data signals; and
 (e) combining the signal sequence generated in step (d) with the received resultant scrambled sequence in such a manner as to descramble the scrambled data signals and to remove the respective signals of said prescribed scrambling sequence from between said preselected ones of the data signals.

51. For use in a communication system wherein the data signals of a serial data signal stream are combined with a prescribed scrambling signal sequence in such a manner as to scramble the data signals of said serial data stream and to insert respective signals of said prescribed scrambling signal sequence between preselected ones of the scrambled data signals and thereby produced a scrambled signal stream, a method receiving and descrambling said scrambled signal stream to obtain said serial data stream comprising the steps of:
 (a) receiving said scrambled signal stream and generating a first signal sequence, corresponding to said prescribed scrambling signal sequence, in synchronism with the respective signals of the prescribed scrambling sequence inserted between preselected ones of the scrambled data signals; and
 (b) generating a second signal sequence, corresponding to said prescribed scrambling sequence and combining said second signal sequence with said scrambled signal stream in such a manner as to descramble the scrambled data signals and remove the respective signals of said prescribed scrambling sequence from between said preselected ones of the data signals to thereby obtain said serial data stream.

* * * * *